Sept. 17, 1935.  H. H. BROOKS  2,014,879
DIAGNOSTIC INSTRUMENT
Filed Oct. 9, 1933
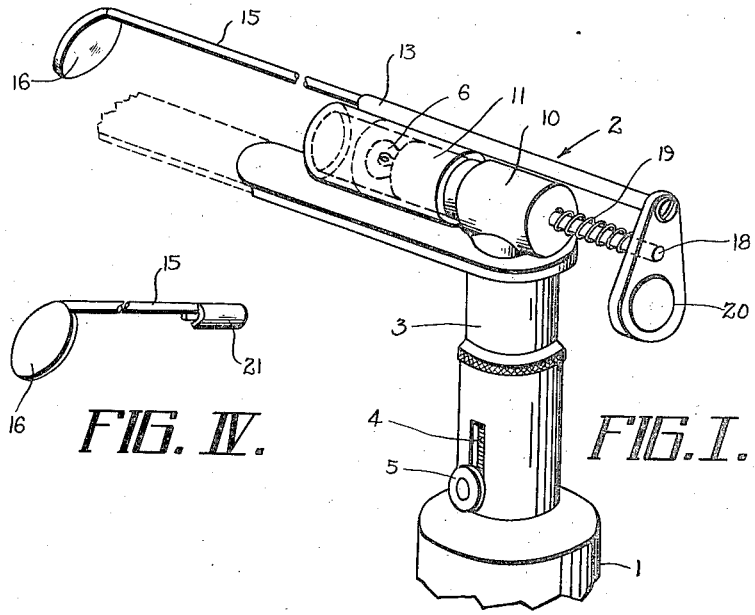
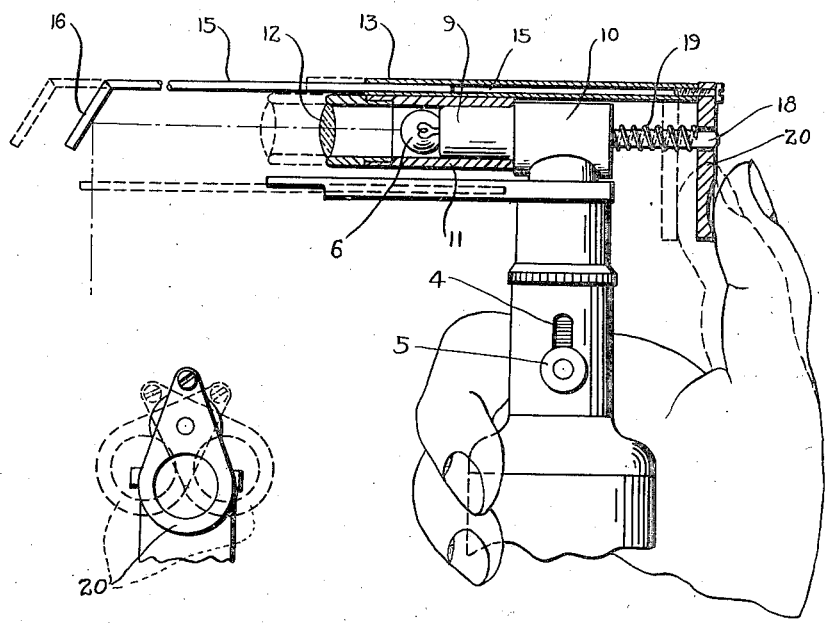
INVENTOR
Harry H. Brooks.
BY
Harry H. Styll
ATTORNEY Patented Sept. 17, 1935

2,014,879

UNITED STATES PATENT OFFICE 2,014,879

DIAGNOSTIC INSTRUMENT

Harry H. Brooks, Southbridge, Mass., assignor to American Optical Company, Southbridge, Mass., a voluntary association of Massachusetts Application October 9, 1933, Serial No. 692,829

4 Claims. (Cl. 128—11)

This invention relates to diagnostic instruments and has particular reference to an improved head and illuminating attachment for said head for an instrument of this character.

One of the principal objects of the invention is to provide a diagnostic instrument utilizing artificial illumination with improved means for concentrating the rays of light from said illumination on the object to be examined.

Another important object of the invention is to provide illumination focusing means and observation means which may be adjusted to immediate requirements during the use of the instrument without having to remove the instrument from its position of use.

Another object of the invention is to provide improved means for controlling the path and focus of the light rays projected by the illuminating means during the use of the instrument.

Another object of the invention is to provide improved means for attaching a light deflecting member to the head of an instrument.

Another object of the invention is to provide means for quickly and easily focusing the light rays projected by the illuminating means during the use of the instrument and without removing the instrument from its position of use.

Other objects and advantages of the invention will become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact details shown and described as the preferred form only has been shown by way of and for the sake of illustration.

Referring to the drawing:

Fig. I is a perspective view of an instrument embodying the invention;

Fig. II is a side view of the instrument embodying the invention and showing parts thereof in section;

Fig. III is a fragmentary rear view of the instrument shown in Fig. II; and

Fig. IV is a view showing a modification of the means for attaching the reflector to the instrument.

Diagnostic instruments for examining cavities such as the throat, etc. have in most instances in the past been provided with illumination means having a more or less fixed focus. This focus, although correct for some uses of the instrument, was in many instances not correct and was very inconvenient and impractical for general use. This was due mostly to the fact that it was not always possible with a fixed focus to get as good illumination with a fixed focus to get as good illumination of a certain area as desired.

It, therefore, is one of the prime objects of this invention to overcome the above difficulties and disadvantages by providing means by which the focus of the illuminating means may be varied as desired and which may be quickly and easily adjusted during the use of the instrument and without removing the instrument from its position of use.

Another object is to provide means whereby the reflective observation means of the instrument may be adjusted simultaneously to the adjusting of the focusing means or separately thereof and without having to remove the instrument from its position of use.

Referring more particularly to the drawing, the device embodying the invention comprises a handle portion 1 and a head portion 2. The handle portion 1 may either contain a battery or means for connecting to the ordinary electric power circuits to supply current for the illuminating means hereinafter described.

The head portion 2 comprises a tubular portion 3 which connects the head 2 and the handle portion 1. This tubular portion 3 contains a rheostat 4 which is controlled by a finger piece 5 which controls the intensity of the illuminating means 6 by which the intensity of said illuminating means may be adjusted to desired intensity.

In the present instance the invention is shown used in connection with a combined tongue depressor and laryngoscope although it is to be understood that it may be used with other diagnostic instruments, the combined tongue depressor and laryngoscope being shown by way of illustration.

The illuminating means or lamp 6 is attached to the member 9 having an enlarged portion 10. Over the portion 9 and in telescoping relation therewith is the tubular member 11 carrying the condensing lens 12. This tubular member 11 is connected by solder or the like to the member 13 which may be formed with the opening 14 into which extends the handle 15 on the reflector 16 and which is carried thereby. This tubular member 11 consists of two parts connected by a telescoping connection which allows the lamp 6 to be removed without having to take the instrument apart.

The member 13 then extends over the rear of the instrument head and carries the finger piece 20. On the rear of the portion 10 is secured the post 18 on which is positioned the coil spring 19 against which the finger piece 20 rests and the force of said spring 19 tends to retain the finger piece 20, condensing lens 12 and reflector 16 in a fixed desired focus until changed by the operator by pressing the finger piece 20.

As shown in Fig. III, by pivoting the finger piece 20 to different positions it is possible to change the position of the reflector 16 to any angle desired by the operator.

It is apparent from the above that this manually operable finger piece 20 does not only provide means for varying the position of the focusing lens 12 relative to the illuminating means 6 but also provides means for simultaneously or separately angling the reflective means 16 about the axis of the projected light. This provides means which will permit observation with illumination in various directions and provides means whereby the intensity of the illumination and the angular position of the reflective means may be varied without removing the instrument from its position of use. Due to the fact that the reflective means 16 is pivotally adjustable about the axis of the projected light the said reflective means when angled, does not move from its aligned relation with said illuminating means.

In Fig. IV is shown a modification of the means for connecting the reflector 16 to the member 13. In this construction the handle 15 on the reflector 16 has the clamp member 21 which fits over and may be clamped to the member 13.

The operation of the device is as follows:

The reflector 16 is inserted into the cavity, which with the device shown is the throat, and the operator then by pushing the finger piece 20 as shown in Fig. II where the dotted lines show the members in extended position, the condensing lens 12 is adjusted with relation to the lamp 6 and as the reflector 16 and lens 12 are in fixed relative position, the device is then in best usable position with the light focused on the area desired by the operator. If it is desired to change the angle of the reflector 16 with respect to the lens 12 and lamp 6, the finger piece is pivoted as shown in Fig. III until the desired angle is reached.

From the foregoing description it will be seen that I have provided simple, efficient and economical means of accomplishing all of the objects and advantages of the invention, particularly that of providing means for varying the focus of the illuminating means and of varying the path of the light rays projected by said illuminating means during the use of the instrument and without removing the instrument from its position of use.

Having described my invention, I claim:

1. In a device of the character described, a support having illuminating means thereon, a member having a light passageway slidably mounted on the support and having a condensing lens adjacent one end thereof in line with the light rays coming from the illuminating means and spring means connected with the slidable member and having means thereon whereby the slidable member may be manually operated under the action of the resiliency of said spring to increase the distance between the lens and illuminating means an amount greater than the focal length of the lens to vary the focal point of said light rays.

2. In a device of the character described, a support having illuminating means thereon, a member having a light passageway slidably mounted on the support and having a condensing lens adjacent one end thereof in line with the light rays coming from the illuminating means and a reflector adjustably mounted thereon in line with the light rays projected through the condensing lens, and spring means connected with the slidable member and having means thereon whereby the slidable member may be manually operated under the action of the resiliency of said spring to increase the distance between the lens and illuminating means an amount greater than the focal length of the lens to vary the focal point of the light rays reflected by said reflector.

3. In a device of the character described, a support having illuminating means thereon, a member having a light passageway slidably and rotatably mounted on the support and having a condensing lens adjacent one end thereof in line with the light rays coming from the illuminating means and a reflector adjustably mounted thereon in line with the light rays projected through the condensing lens, and spring means connected with the slidable and rotatable member and having means thereon whereby said slidable and rotatable member may be manually operated under the action of the resiliency of said spring to increase the distance between the lens and illuminating means an amount greater than the focal length of the lens to vary the focal point of the light rays reflected by the reflector and to rotate said reflector to change the angle of reflection.

4. In a device of the character described, a support, illuminating means on the support, a reflector and a lens aligned with said illuminating means and with each other, means for separately adjusting the reflector and lens relative to each other and to the illuminating means, and means for moving said reflector and lens as a unit an amount sufficient to place the lens at a distance from the illuminating means greater than the focal length of the lens to change the converging point of the rays of light projected through the lens and reflected by the reflector.

HARRY H. BROOKS.